US006685420B1

(12) United States Patent
Moser et al.

(10) Patent No.: US 6,685,420 B1
(45) Date of Patent: Feb. 3, 2004

(54) STACKABLE CARGO BIN WITH DUMP FEATURE

(76) Inventors: Robert Moser, 113 Shongaloo La., Mandeville, LA (US) 70471; Charles H. Rood, 713 St. Etienne Rd., Broussard, LA (US) 70447

( * ) Notice: Subject to any disclaimer, the term of this patent is extended or adjusted under 35 U.S.C. 154(b) by 44 days.

(21) Appl. No.: 09/952,282

(22) Filed: Sep. 12, 2001

Related U.S. Application Data

(60) Provisional application No. 60/232,574, filed on Sep. 13, 2000.

(51) Int. Cl.[7] ................................................ B65G 65/23
(52) U.S. Cl. ......................... 414/422; 414/420; 220/1.5
(58) Field of Search ................................. 414/607, 422, 414/421, 420, 908, 620, 640; 220/1.5

(56) References Cited

U.S. PATENT DOCUMENTS

| | | | | | |
|---|---|---|---|---|---|
| 2,664,219 | A | | 12/1953 | Schmidt | |
| 2,971,662 | A | * | 2/1961 | Dunham | |
| 3,143,233 | A | * | 8/1964 | Evans et al. | |
| 4,212,478 | A | * | 7/1980 | McGrath, Jr. | |
| 4,540,330 | A | * | 9/1985 | Taylor | 414/422 X |
| 4,643,314 | A | | 2/1987 | Kidd | |
| 5,617,967 | A | | 4/1997 | Neidhart | |
| 5,624,222 | A | * | 4/1997 | Hiatt et al. | 414/607 |
| 6,302,637 | B1 | * | 10/2001 | Andros | 414/421 |

FOREIGN PATENT DOCUMENTS

| | | | | | |
|---|---|---|---|---|---|
| JP | 355052827 | A | * | 4/1980 | 414/422 |

* cited by examiner

*Primary Examiner*—James W. Keenan
(74) *Attorney, Agent, or Firm*—Joseph T. Regard, Ltd, plc

(57) ABSTRACT

A cargo bin dumping system wherein there is provided a cargo bin as disclosed in the preferred embodiment of the present invention, with the addition of first and second lateral receiving stinger tubes for the engagement of a stinger therethrough, so as to facilitate the safe, and efficient dumping of the contents of a cargo basket into a waste bin or the like utilizing an ordinary forklift. A stinger specifically designed to work with the present system is also provided.

2 Claims, 8 Drawing Sheets

STACKABLE CARGO BIN WITH DUMP FEATURE

This application claims the benefit of provisional application Ser. No. 60/232,574 filed Sep. 13, 2000.

TECHNICAL FIELD OF THE INVENTION

The present invention relates to cargo storage systems, and in particular to a heavy-duty cargo bin unit configured for rugged use in hostile environments, such as in the oil drilling and production industry.

The preferred embodiment of the present invention comprises a cargo bin unit of a generally rectilinear construction, fabricated of heavy gauge steel tubing, each cargo bin having a series of support members for spacing the basket above the floor, the members configured to facilitate lifting of the basket via a forklift or the like. Further, each of the support members is positioned to allow for the nested stacking of one cargo bin atop the other, such that the lower portion support members would fit snugly within the interior walls of the cargo bin upon which it is placed, thereby providing a locking of the stacked cargo bins to prevent tipping, while the upper portion of the support members rides upon the upper edges of the bin upon which it is stacked, so as to provide a space for the placement of forks or the like for lifting the basket.

The size and configuration of the basket may vary depending upon the application, and the unit may be configured to receive templates for the customized storage of particular items such as drilling tools, bits, etc.

A second embodiment of the present invention contemplates a cargo bin dumping system wherein there is provided a cargo bin as disclosed in the preferred embodiment of the present invention, with the addition of first and second lateral receiving stinger tubes for the engagement of a stinger therethrough, so as to facilitate the safe, and efficient dumping of the contents of a cargo basket into a waste bin or the like utilizing an ordinary forklift. A stinger specifically designed to work with the present system is also provided.

BACKGROUND OF THE INVENTION

Cargo baskets as currently used in oil industry typically include a steel angle iron frame having expanded metal side walls, a floor, and either three skids or the like for providing support and allowing a fork lift to engage thereunder, or four pad eyes situated at opposing corners, each pad eye for engaging a cable to form a lifting sling.

Typically, these bins are of such a quality and construction that the weight of the contents must be monitored or the baskets can be overweighted and fail during use, which can result in serious injuries and damage. Space is often quite limited in the environment in which these lifting baskets are employed, and often users of these prior art bins will stack them upon one another, even though the bins are not configured or reinforced for stacking, which can result in failure of the lower bins due to excessive weight, and/or the collapse of the stacked bins as they do not nest or interlock with the bin upon which they are placed.

Prior art bins also tend to either be specialized to receive only a specific item, or are only an open bin area for receiving items piled upon one another. The prior art is believed to have failed to provide a modular template system for the placement into an existing bin to temporarily convert same to a specific, customized transport and storage system.

Dumping of the contents form prior art bins can also be a problem; flipping an open top bin via a crane involves multiple personnel, requires a crane, and can be quite dangerous. Specialized dump baskets can be expensive and dangerous, such as baskets having false floors which open upon the pulling of a pin or the like.

The prior art has thereby failed to provide a cargo bin which provides a heavy duty, "failsafe" construction which can handle the weight of almost any contents placed therein, while providing a stackable and dumpable system which is economical, safe and effective.

GENERAL SUMMARY DISCUSSION OF THE INVENTION

The present invention provides a cargo bin which is stronger, stackable, and which may be dumped, thereby a more cost effective, safer, and reliable system than prior art units.

The preferred embodiment of the present invention comprises a cargo bin having a heavy duty construction, comprising a frame supporting two opposing side and end walls, and floor of expanded metal, the frame being of heavy duty construction to support at least twice of the weight of any material capable of being placed within the bin, so that the units may be stacked at least two high. The upper peripheral edge of the frame has affixed thereto pad eyes at each corner, each pad eye configured to engage a lifting cable, the cables configured to form a lifting sling for the unit having a gross lifting capacity which would exceed the weight of any material filling the bin.

Situated in spaced, lateral fashion under the cargo bin of the present invention are three skids for supporting the bin in spaced relationship above the ground or support surface, the skids being spaced and configured to allow fork lift to engage and lift the bin. Each skid has a length conforming to the inner width of the storage area of the bin, and is situated thusly under the bin, such that each skid has a recess provided under the outer edge of the frame, configured to allow a bin to stack upon the open top of a similar bin, engaging the upper peripheral edge of the frame, so as to provide a slotted, nesting engagement.

The preferred embodiment of the present invention may be configured to receive cargo templates configured to hold and retain specialized cargo, such as drilling tools or the like. The template may be in the form of multiple vertically situated cylinders, each for receiving a tool, the cylinders joined via a mounting frame configured to engage the cargo bin via threaded fasteners, brackets or the like. Another template may comprise first and second, horizontally spaced brackets supported by first and second vertical supports engaging a common base frame, the base frame configured to engage the floor or sidewalls of the cargo bin via threaded fastener, bracket or the like, this template for supporting a drilling tool or the like in horizontal, contained fashion within the bin.

A second embodiment of the cargo bin of the present invention is configured to facilitate safe dumping of the contents of the bin utilizing a single operator and a common forklift. This embodiment comprises a cargo bin like the preferred embodiment of the present invention, but with the addition of first and second, laterally situated stinger tubes, each configured to selectively receive a stinger member operatively connected to a forklift or the like. The first and second stinger tubes are situated in opposing, off-center fashion relative to the sidewalls of the cargo bin, the first stinger tube situated in the lower portion of the cargo bin, the second stinger tube situated in the upper portion of the cargo bin. Also provided is a stinger unit configured to engage the forks of the forklift, the stinger unit including a stinger pipe for selectively engaging the first or second stinger tube formed in the sidewalls of the cargo bin.

As will be shown, the first, lower stinger tube is configured for dumping the bin, placing the bin in an inverted position, while the second, upper stinger tube is configured for returning the bin to an upright position.

The present invention thereby provides a rugged, reliable transport and storage system for utilization in marine and cargo capacities. It is thereby designed to be hoistable, as well as transported via a forklift, and can be stacked and dumped in a safe, stabilized, and reliable fashion.

It is therefore an object of the present invention to provide a cargo bin which is stronger and more rugged than prior art systems.

It is another object of the present invention to provide a cargo bin which is stackable, and stacks in a nestable, stable fashion.

It is another object of the present invention to provide a cargo bin which may be transported via a crane or a forklift.

It is another object of the present invention to provide a cargo bin which may customized to carry specific items via a template insert.

It is another object of the present invention to provide a cargo bin and dumping system which may be implemented by a single operator utilizing a standard forklift.

It is another object of the present invention to provide a cargo bin having dump capacity utilizing a stinger system configured to engage a standard forklift.

Lastly, it is an object of the present invention to provide a cargo bin system which is stronger, safer, more economical to implement and maintain, and more flexible in its use when compared to prior art systems.

BRIEF DESCRIPTION OF DRAWINGS

For a further understanding of the nature and objects of the present invention, reference should be had to the following detailed description, taken in conjunction with the accompanying drawings, in which like parts are given like reference numerals, and wherein.

DETAILED DISCUSSION OF THE INVENTION

Figure 1A:
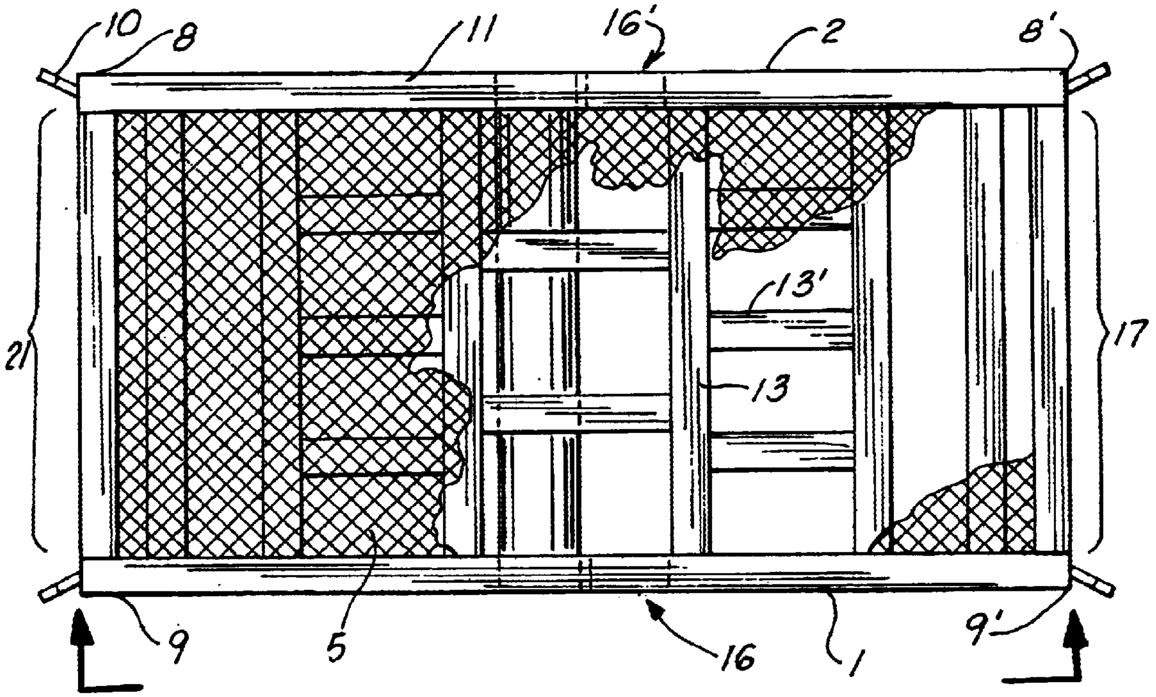
FIG. 1A is a top view of the dumping embodiment of the cargo bin of the present invention.
Figure 1B:
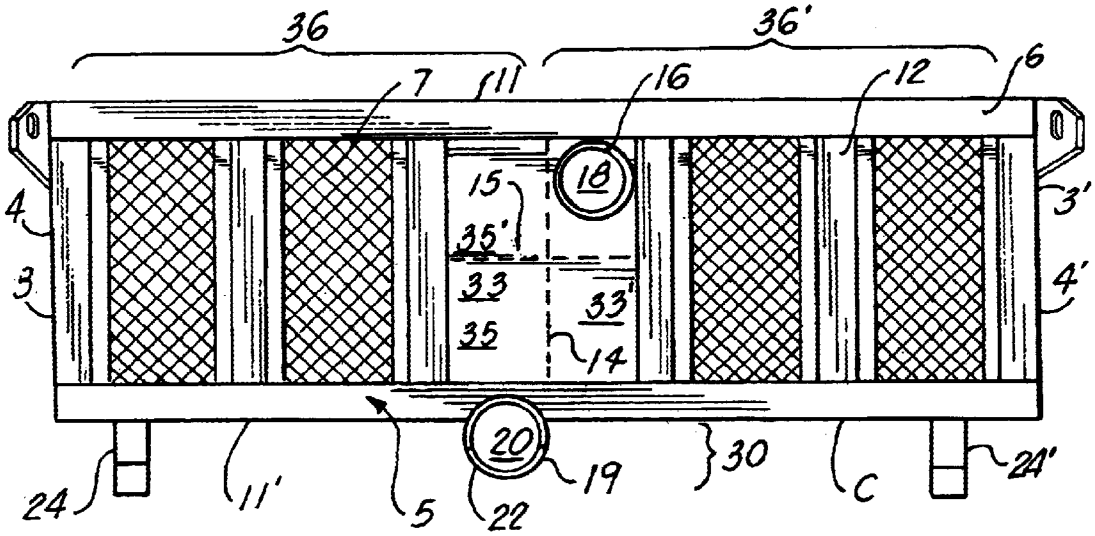
FIG. 1B is a side, perspective view of the cargo bin of FIG. 1A.
Figures 1C, 1D, 1E:
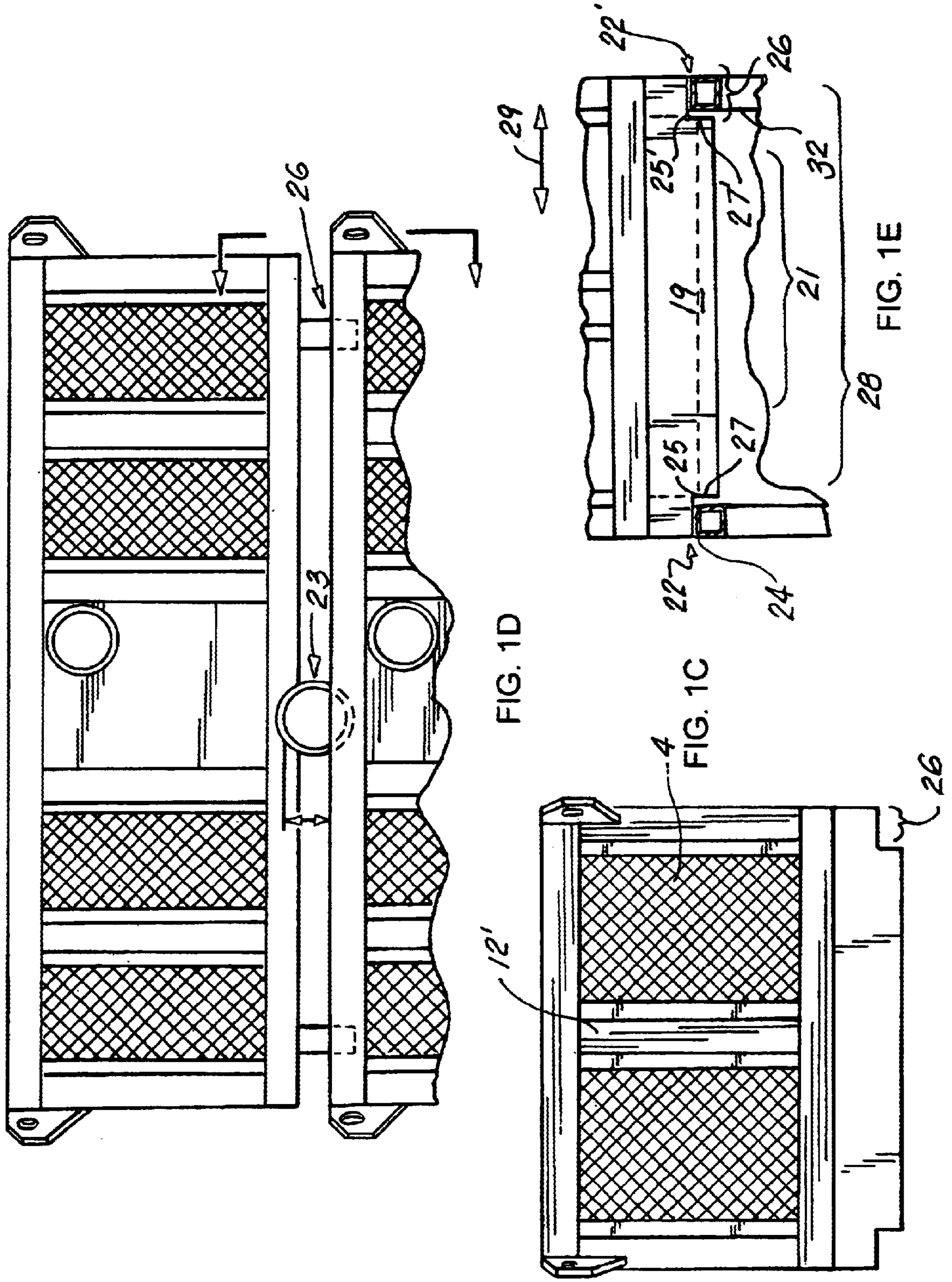
FIG. 1C is an end view of the cargo bin of FIG. 1A.
FIG. 1D is a side view of the cargo bin of FIG. 1A, shown stacked upon a like cargo bin.
FIG. 1E is an end, partially cut-away view of the stacked cargo bins of FIG. 1D, illustrating the nesting feature of the invention.
Figure 2:
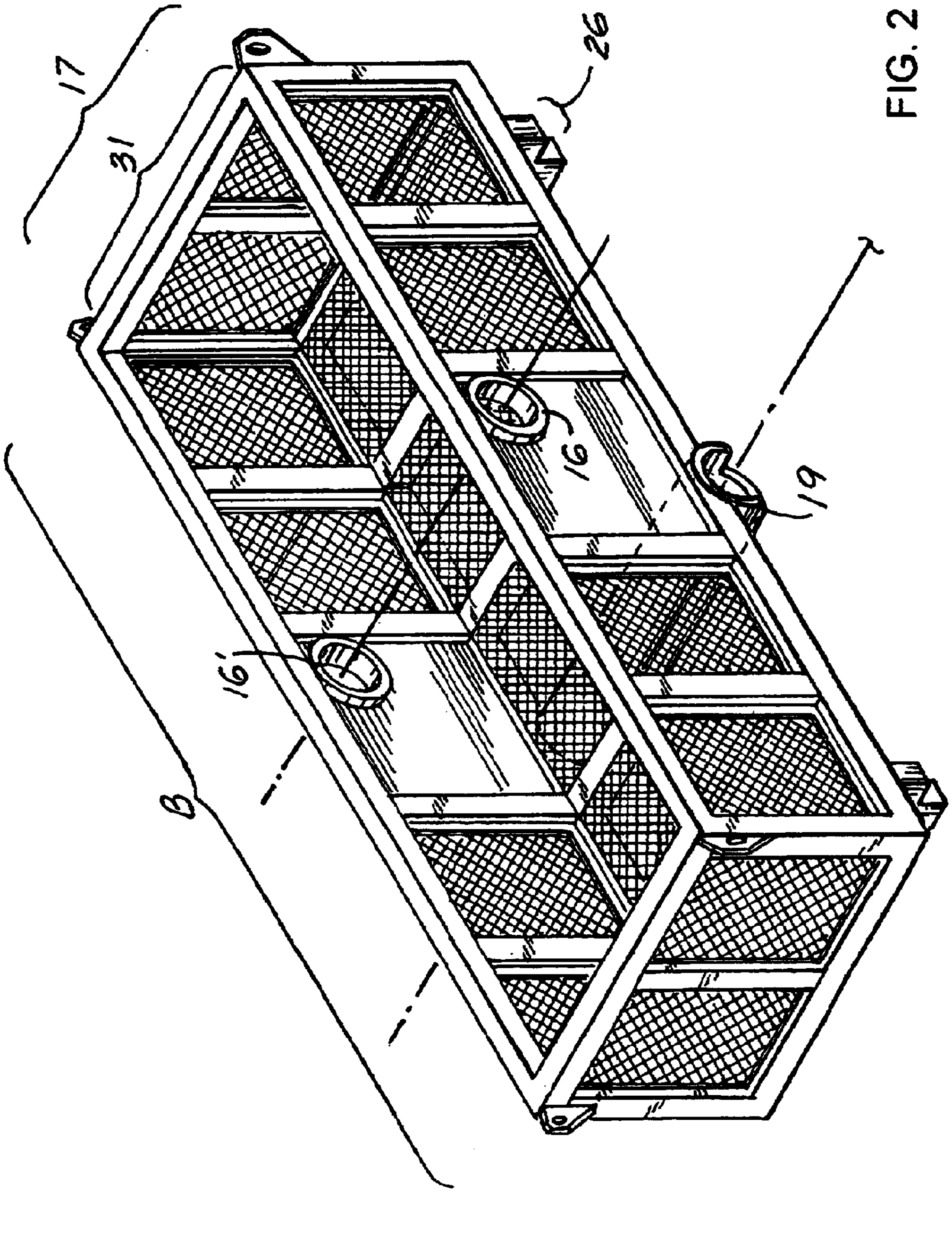
FIG. 2 is an top, isometric view of the cargo bin of FIG. 1.

Referring to FIGS. 1A–1E, the cargo bin C of the present invention comprises first 1 and second 2 vertical walls having first 3 and second 3' ends joined by first 4 and second 4' end walls, respectively, forming first 8, second 8', third 9, and fourth 9' upper corners, which may have a lifting pad eye 10 emanating therefrom. A floor 5 is provided to join the lower portions of the four walls to form a bin holding area B.

A frame 6 of square tubing or the like forms the edges of the bin, including the top edge 11, bottom edge 11', vertical support members 12, and underlying horizontal stringer 13 and braces 13' forming the floor. A layer of heavy gauge expanded metal forms the walls 7 and floor 7' on the interior of the bin, reinforced by the frame.

Each pad eye 10 is configured to engage a lifting cable, with the cables ideally configured to form a lifting sling for the unit having a gross lifting capacity which would exceed the weight of any material filling the bin. Further, the heavy duty construction of the present bin allows the bins to be stacked at least two high, even when filled with material.

Situated in spaced, lateral fashion under the cargo bin of the present invention are at least first 24 and second 24' skids for supporting the bin in spaced relationship above 30 the ground or support surface, the skids being spaced and configured to allow a fork lift to engage and lift the bin.

Each skid 24, 24' has a length conforming to the inner width 31 of the bin storage area B, and is situated thusly under the bin, such that each skid has at its ends 25, 25' a recess 26 formed under the outer edge of the frame, configured to allow a bin to stack upon the open top of a similar bin, engaging the upper peripheral edge of the frame, so that the end of each skid has an inner edge 27, 27' engaging the inner wall 32 of the bin so as to provide a secure, nesting engagement wherein a portion 28 of the each skid resides in the bin holding area of the bin which it is stacked upon, so as to resist sliding or tilting 29 of the stacked bins.

The cargo bin may include a dump feature for facilitating reliable and safe dumping of the contents of the unit utilizing a standard forklift, wherein there is provided upper 16 and lower 19, opposing, offset stinger tubes configured to engage a stinger engaged to the forklift.

Each stinger tube 16, 19 is situated in a particular fashion such that the lower stinger tube 19 is to be used for the dumping operation, while the upper stinger tube 19 is utilized to facilitate the up righting of the dumped cargo bin.

Accordingly, the upper stinger tube component comprises two separated, axially aligned tube portions 16, 16' formed in the first 1 and second 2 walls of the cargo bin, so as to provide an open area 17 between the tubes commensurate with the width 31 of the cargo bin holding area B. The upper stringer tube component is situated on the second side 33' of the transverse vertical medial axis 14 which vertically equally divides the empty cargo bin by weight into first 36 and second 36' equally balanced sections, as well as the upper side 35' of the basket relative to the longitudinal, medial axis 15 which horizontally equally divides the empty cargo bin, by weight. The interior of the tube portions 16, 16' forms a stinger receiving area 18 for placement of a stinger therein, as will be more fully discussed infra.

As shown, the lower stinger tube 19 in the preferred embodiment of the invention comprises a contiguous tube having a stinger receiving area 20 formed therein, the tube having a length 21 and ends 22, 22' laterally engaging the frame and floor outside of the bin loading area, generally between the skids 24, 24', the ends 22, 22' of the tube formed so as not to emanate below or past the ends of the skids, so as not to interfere with the nested stacking of one bin upon the another. Accordingly, the lower stinger tube may be of a length commensurate with the width of the cargo bin loading area 31, and situated directly below 23 and laterally aligned with the cargo bin loading area.

Like the upper stinger tube, the lower stinger tube 19 is situated in an unbalanced, offset fashion on the bin but opposite that of the upper stinger tube, with the lower stinger tube situated on the first side 33 of the transverse vertical medial axis 14, as well as the lower side 35 relative to the longitudinal medial axis 15. Thus, the opposing upper and lower stinger tubes can be engaged by a stinger to facilitate pivotal support of the bin wherein the weight of the bin will urge same to pivot in opposing directions, depending upon which stinger tube is engaged.

An example of measurements for the cargo bin is 4'×4'×8', with stinger tubes comprising 8⅝" schedule 80 pipe, and the cargo bin as constructed has an indicated use capacity of 8,000 pounds, but the actual amount which it can hold is engineered to be more than twice this amount.

Figure 3:
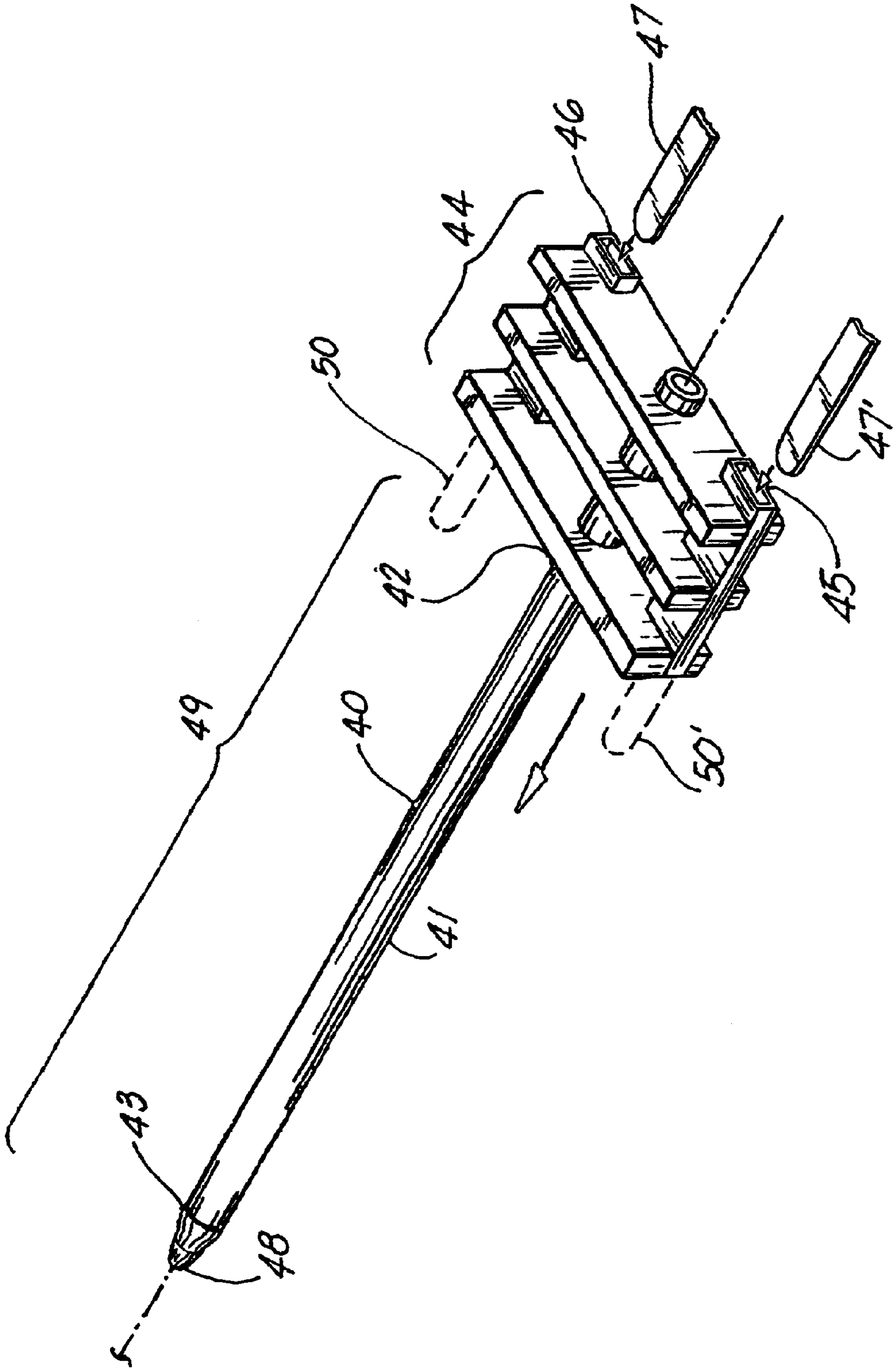
FIG. 3 is a top, isometric view of the stinger utilized in conjunction with a forklift in positioning and dumping the cargo bin of FIG. 1.
Figure 4A:
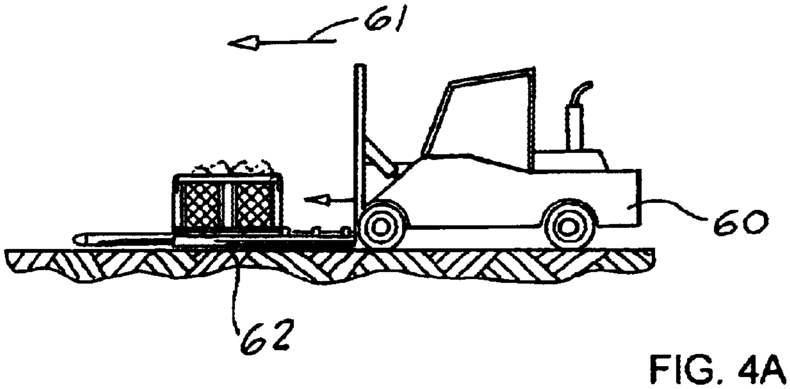
FIG. 4A is a side view of the method of dumping the cargo bin of FIG. 1 utilizing a forklift having the stinger of FIG. 3 mounted thereupon.
Figure 4B:
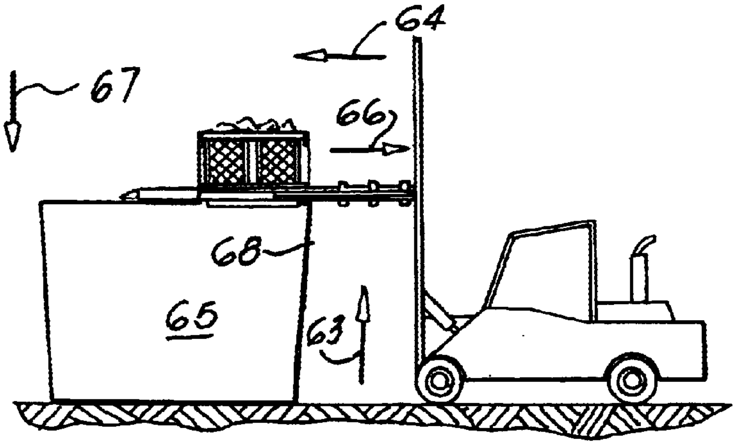
FIG. 4B is a side view of the method of FIG. 4A, illustrating the positioning of the cargo bin over a waste bin.
Figure 4C:
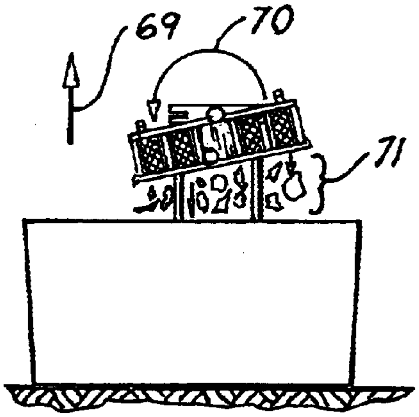
FIG. 4C is a side view of the method of FIG. 4A, illustrating the dumping of the cargo bin over the waste bin, providing a dumped, inverted cargo bin.
Figure 4D:
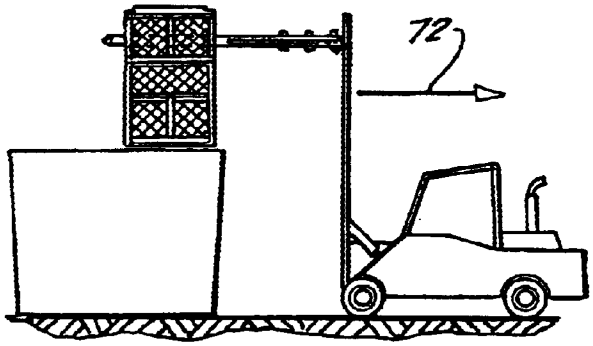
FIG. 4D is a side view of the method of FIG. 4A, illustrating the withdrawal of the inverted cargo bin from the waste bin.
Figure 4E:
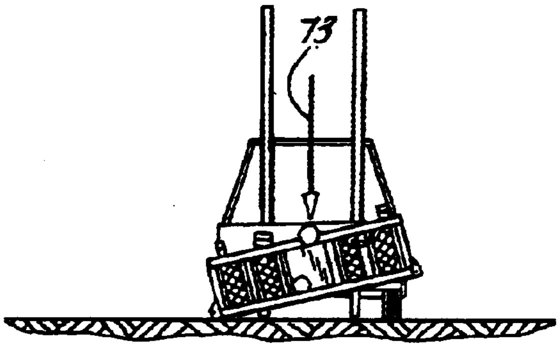
FIG. 4E is a side view of the method of FIG. 4A, illustrating the placement of the inverted bin upon the ground.
Figure 4F:
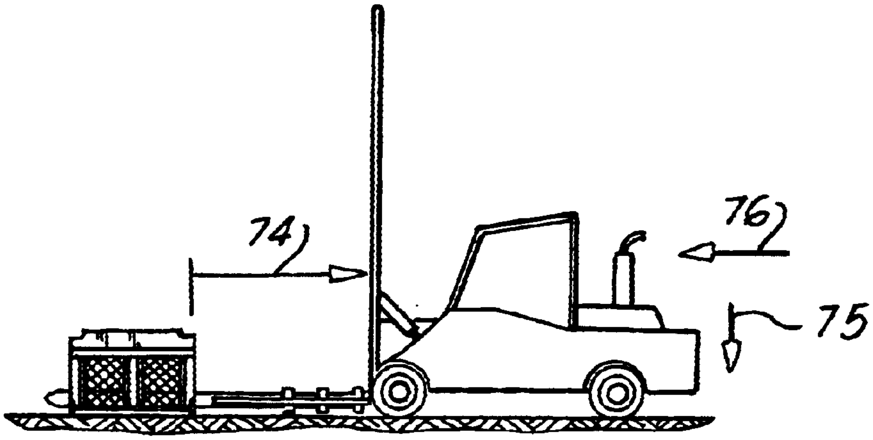
FIG. 4F is a side view of the method of FIG. 4A, illustrating the placement of the stinger into the second stinger tube of the inverted bin.
Figure 4G:
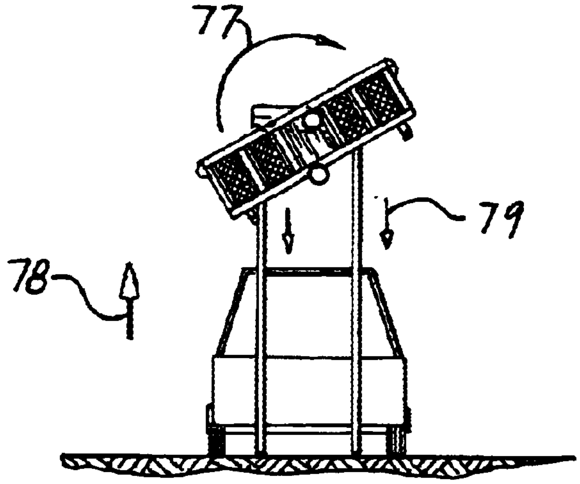
FIG. 4G is a side view illustrating the lifting of the cargo bin via the second stinger tube so as to render the cargo bin into an upright position.

Continuing with FIG. 3, a specially designed stinger unit 40 is provided which comprises a stinger member 41 having first 42 and second 43 ends, the first 42 end having a forklift interface 44 situated therewith having first 45 and second 46, parallel fork channels which are evenly juxtaposed about and longitudinally aligned with the first end of the stinger member, which fork channels are configured to receive forklift forks 47', 47 respectively, so that the ends of the forks 50', 50 protrude through the ends of the fork channels sufficient to allow lifting of the cargo bin via the exposed forks 50', 50, as will be more fully discussed infra.

As further shown, the stinger member 41 in the preferred embodiment is cylindrical in configuration, having a length 49 suffcient to support a cargo bin via engaging the stinger receiving areas of the upper or lower stinger tubes, and includes a stabbing point 48 to facilitate insertion of the stinger member into the stinger tubes.

The stinger member of the preferred embodiment is 8 foot long, utilizing one inch thick 4140 steel tubing, eight inch diameter, with the tip 48 narrowed to a 1½ inch end.

The stinger unit is configured to work with 4–8 foot forks on a 20,000 pound capacity forklift.

Continuing with FIGS. 4A–4G, and further referencing FIGS. 1A–1E, 2, and 3, in use in an exemplary cargo bin dumping operation, a forklift 60 engages 61 the lower stinger tube via the stinger member while simultaneously placing 62 the exposed forks 50, 50' under the cargo bin.

The forklift then lifts 63 the cargo bin and positions 64 same over a dump bin 65, then lowers 67 the cargo bin until its skids 24 are situated within the dump bin. The forklift then backs up 66 until the skid engages the inner wall 68 of the bin, and then continues backing up until the exposed forks no longer engage thee underside of the cargo bin, and the cargo bin is only supported by the stinger in the lower stinger tube 19.

The forklift may then urge the cargo bin forward and raise 69 the bin to allow the stinger supported cargo bin to pivot 70 about the stinger member due to the imbalanced load, dumping 71 the cargo in the cargo bin into the dump bin, providing an inverted bin.

The forklift then may lift and removes 72 the inverted cargo bin from the dump bin, placing 73 the inverted bin on the ground, and backing 74 the forklift from the cargo bin so as to remove the stinger member from the lower stinger tube 19 (now furthest from the ground as the cargo bin is inverted) from the cargo bin.

The forklift then lowers 75 and positions the stinger member to engage 76 the upper stinger tube 16' (now closest to the ground as the cargo bin is inverted). It is iterated that only the stinger member is to engage the cargo bin via the upper stinger tube, and the exposed forks are not to engage the bin. The forks perform the function of support members, and the disengagement of the forks from the cargo bin allows the bin to be supported by the stinger member so as to pivot about same due to the unbalanced weight distribution.

Lastly, the forklift then lifts 78 the cargo bin via the stinger member, which results in an imbalanced distribution of the mass of the cargo bin via the offset upper stinger tube, so that the cylindrical communication of the upper stinger tube and the cylindrical stinger member allows the cargo bin to pivot 77 to an upright position. The up righted cargo bin is then lowered 79 to the ground, and the dumping operation complete.

Figure 5:
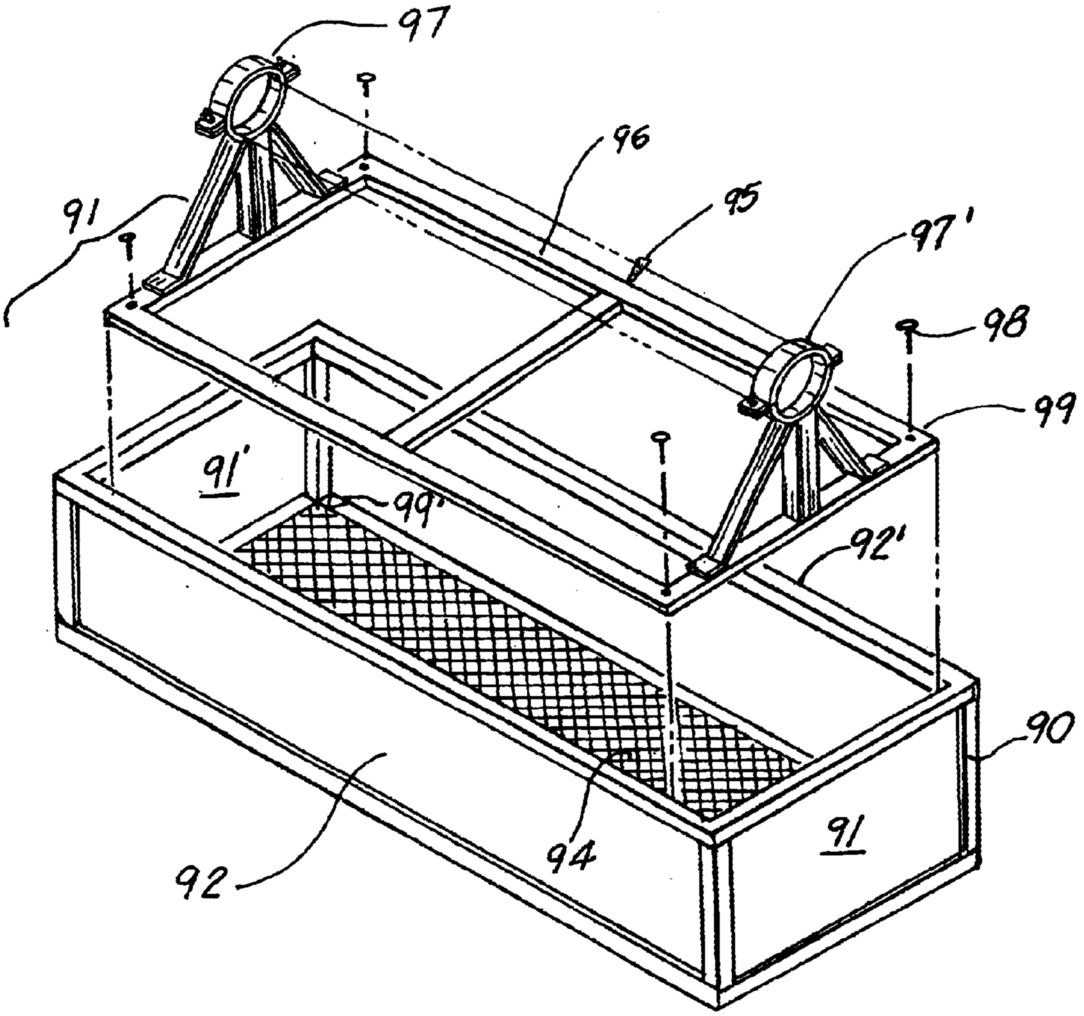
FIG. 5 is an upper, isometric view of a cargo bin having a template configured to be removably placed therein for receiving a particularly configured cargo in a secure fashion.

Continuing with FIG. 5 of the drawings, an alternative embodiment of the present invention contemplates a cargo bin 90 having a storage area 91 formed by first 92 and second 92' side walls, first 93 and second 93' end walls, and a floor 94, and a template 95 configured to engage the cargo bin 90 to convert same into a specialized carrier comprising a base 96 configured to engage the floor 94 of the cargo bin via threaded fasteners 98 engaging fastener holes 99, 99', or via bracket(s) or the like, the base supporting a rack 97, 97', for example, for horizontally engaging and supporting a drilling tool or the like in a contained and secure fashion.

An summary of the method of the present invention for dumping a cargo bin into a dump area might comprise, for example, the steps of:

a. providing a cargo bin having a vertical axis defining a medially balanced weight load, said vertical axis further defining first and second vertical portions of said cargo bin, said first wall of said cargo bin having formed therethrough a first interface for selectively receiving a stinger through said first vertical portion of said cargo bin, and a second interface for selectively receiving said stinger through said second vertical portion of said cargo bin;

b. providing a stinger component comprising a stinger member associated with a support member;

c. engaging said support member to said cargo bin;

d. engaging said stinger member to said first interface of said cargo bin;

e. lifting said cargo bin, and placing same over a dump area;

f. disengaging said lifting member from said cargo bin;

g. allowing gravity to pivot said cargo bin about said stinger via said first interface, dumping the contents of said cargo bin, providing an inverted cargo bin;

h. placing said inverted cargo bin upon a support surface;

i. disengaging said stinger member from said first interface;

j. engaging said stinger member to said second interface of said inverted cargo bin;

k. lifting said inverted cargo bin by raising said stinger member;

l. allowing gravity to pivot said stinger via said second interface, providing an up righted cargo bin.

Figure 6A:
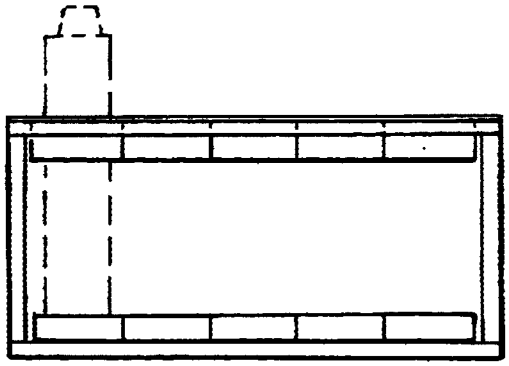
FIG. 6 is an upper, isometric view of a cargo bin having a second template configuration.
Figure 6B:
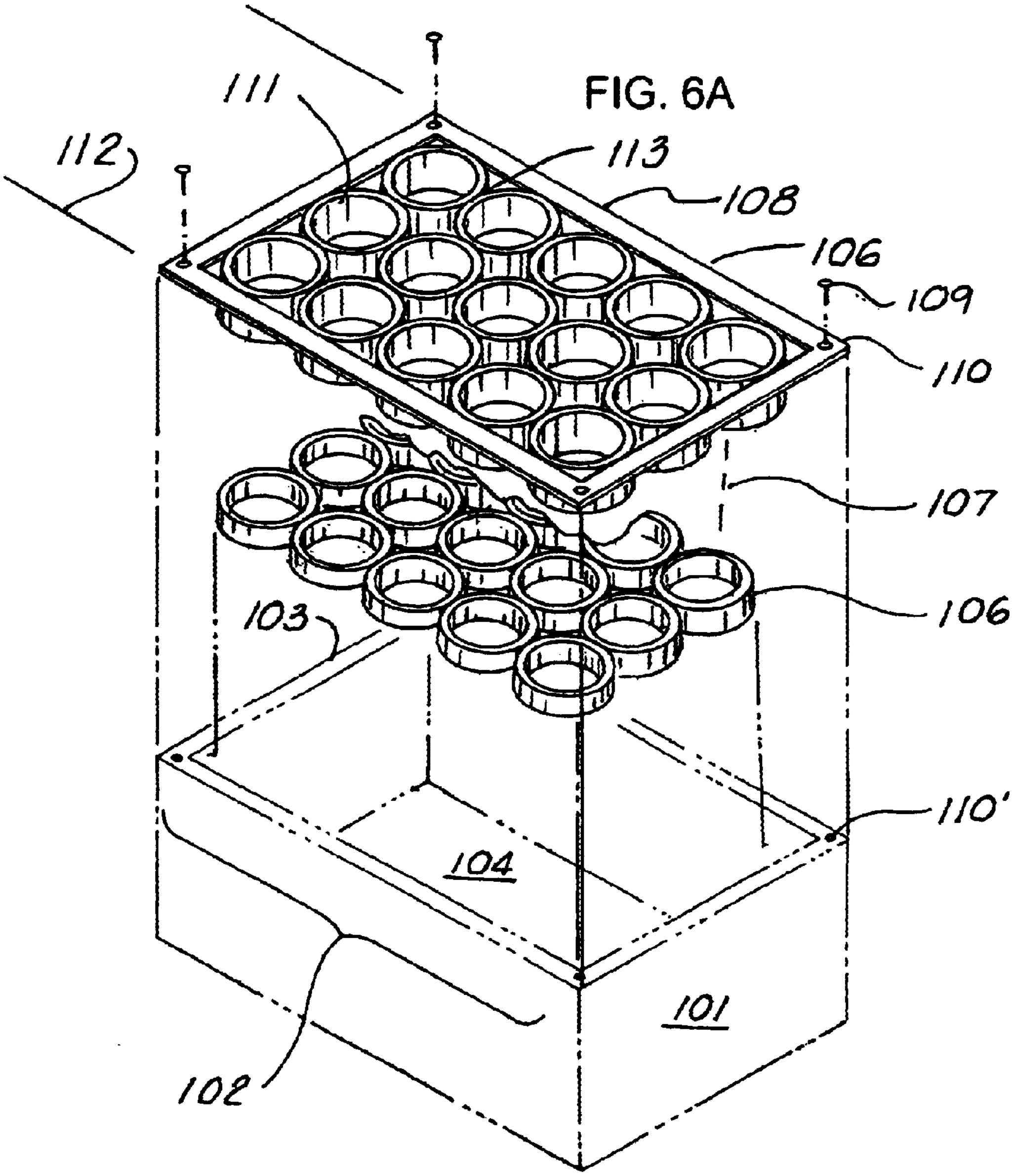

FIGS. 6A and 6B illustrate another alternative embodiment of the invention of the invention of FIG. 5, wherein there is provided a cargo bin 101 having a storage area 102 having an upper edge 103 and a floor 104. An upper template 105 component is provided comprising a series of sleeve members 111 joined at their peripheries 112 along a common plane 113 is framed by a frame 108 configured to engage the upper edge 103 of the cargo bin 101, while a base component 106 comprising a like set of sleeve members joined at their peripheries is provided in axial alignment 107 with the sleeve members 111 forming the upper template 105, so as to facilitate the insertion of items through the sleeve members forming the upper template and the base component for secure storage and transport.

The invention embodiments herein described are done so in detail for exemplary purposes only, and may be subject to many different variations in design, structure, application and operation methodology. Thus, the detailed disclosures therein should be interpreted in an illustrative, exemplary manner, and not in a limited sense.

What is claimed is:

1. A bin dumping system, comprising:

a cargo bin comprising a floor, first and second side walls, and first and second end walls defining an enclosure having an underside, said cargo bin having a width and a vertical axis defining a medially balanced weight load, said vertical axis further defining first and second vertical sections of said cargo bin, said first and second side walls of said cargo bin having formed therethrough a first lifting interface for selectively receiving a lifting member through said first vertical section of said cargo bin;

a stinger unit (40) comprising:

stinger (41) comprising an elongated, generally horizontally situated lifting member having first (42) and second (43) ends and a length greater than said width of said cargo bin, said stinger formed to slidingly engage said first lifting interface; and a fork interface engaged to said first end of said stinger, said fork interface further comprising first and second parallel fork channels which are longitudinally aligned with said first end of said stinger;

whereby when said fork channels of said fork interface are engaged by the forks of a forklift, and said forklift lifts said stinger and maneuvers said stinger via wheels on the forklift to facilitate sliding engagement of said stinger with said first lifting interface, and concurrently maneuvers the tips of the forks of the forklift through fork channels of the fork interface to engage the underside of the cargo bin, the cargo bin may be lifted by the tips of the forks and supported by the lifting interface so to allow the positioning of said cargo bin above a dump bin; and whereby when said fork interface is lowered by said forklift so as to allow said cargo bin to engage the dump bin and the forklift withdraws said fork tips from the underside of said cargo bin whilst said stinger continues to engage said first lifting interface, an imbalance in the positioning of said first lifting interface on said cargo bin facilitates the pivoting of said cargo bin about said stinger, causing said cargo bin to dump any contents therein into said dump bin.

2. The bin dumping system of claim 1, wherein said cargo bin further comprises a second lifting interface for selectively receiving said stinger through said second vertical section of said cargo bin in the vicinity of said floor of said cargo bin, whereby upon said cargo bin having been placed upon the ground in an inverted position, and where upon said stinger having been slidingly positioned in said second lifting interface and lifted by a forklift, an imbalance in the positioning of said second lifting interface on said cargo bin facilitates the pivoting of said cargo bin via said second lifting interface about said stinger so as to allow an operator of the forklift to upright said cargo bin.

* * * * *